J. F. ROGERS.
COMPENSATING MECHANISM FOR MOTOR VEHICLES.
APPLICATION FILED AUG. 10, 1908.

1,002,870.

Patented Sept. 12, 1911.
3 SHEETS—SHEET 1.

ATTEST
J. M. Fisher
F. C. Museum

INVENTOR
John Frank Rogers,
By Fisher & Moser Attys.

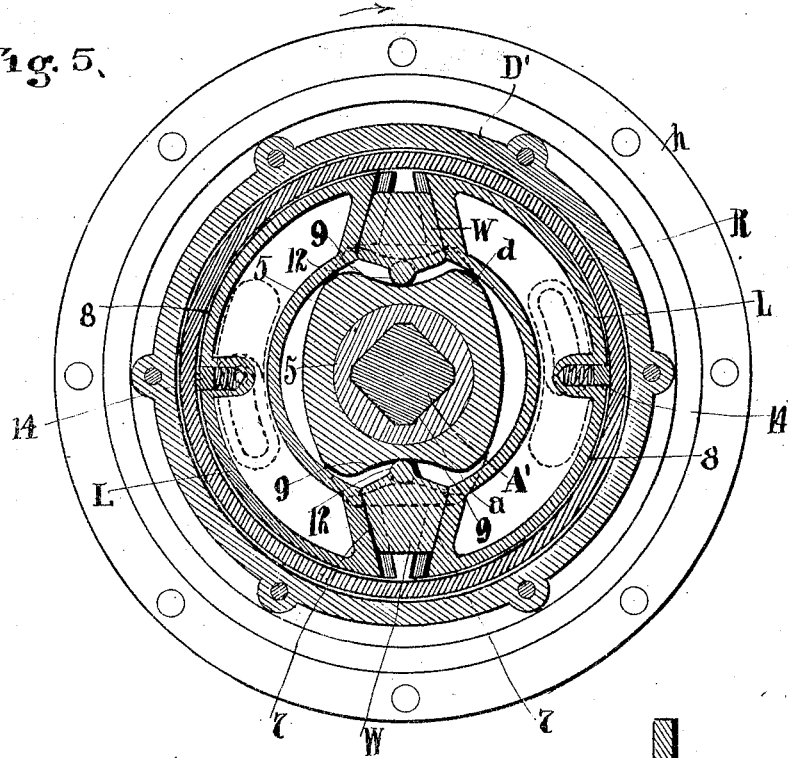
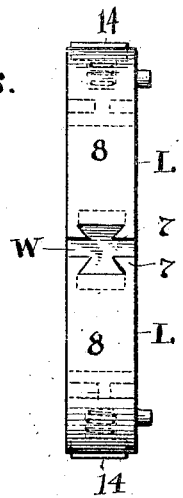
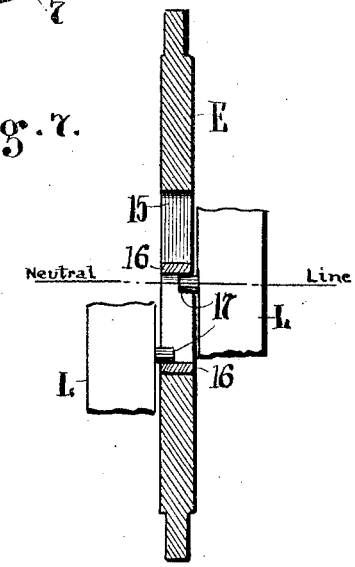

J. F. ROGERS.
COMPENSATING MECHANISM FOR MOTOR VEHICLES.
APPLICATION FILED AUG. 10, 1908.

1,002,870.

Patented Sept. 12, 1911.

3 SHEETS—SHEET 3.

ATTEST
E. M. Fisher
F. C. Museum

INVENTOR
John Frank Rogers,
By Fisher & Moser, ATTYS.

ated Sept. 12, 1911.

UNITED STATES PATENT OFFICE.

JOHN FRANK ROGERS, OF CLEVELAND, OHIO.

COMPENSATING MECHANISM FOR MOTOR-VEHICLES.

1,002,870. Specification of Letters Patent. Patented Sept. 12, 1911.

Application filed August 10, 1908. Serial No. 447,724.

*To all whom it may concern:*

Be it known that I, JOHN FRANK ROGERS, a citizen of the United States, residing at Cleveland, in the county of Cuyahoga and State of Ohio, have invented certain new and useful Improvements in Compensating Mechanism for Motor-Vehicles, and do declare that the following is a full, clear, and exact description of the invention, which will enable others skilled in the art to which it appertains to make and use the same.

My invention relates to compensating mechanism for motor vehicles, and the said mechanism is adapted to both drive and brake the vehicle, and to automatically accommodate itself to the turnings of the vehicle and to the varying speeds of the wheels on its axles incident to such turning, all substantially as shown and described and particularly pointed out in the claims.

Figure 1:
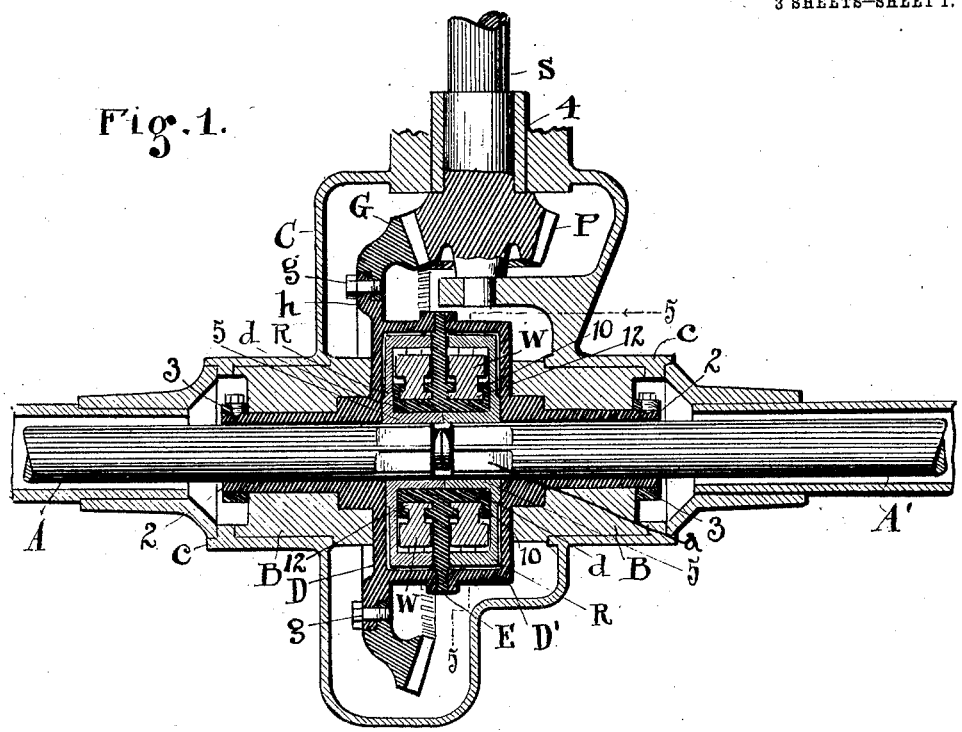
Figure 2:
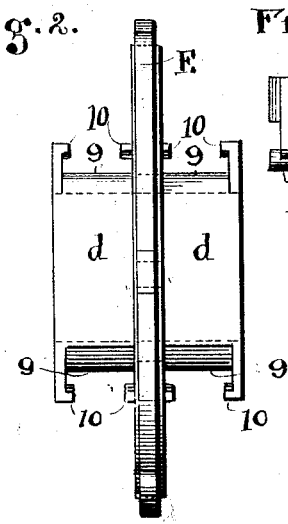
Figure 4:
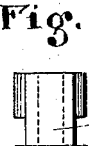
Figure 3:
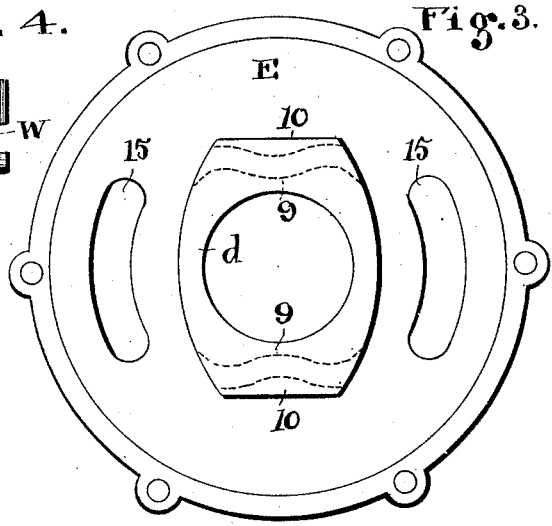
Figure 8:
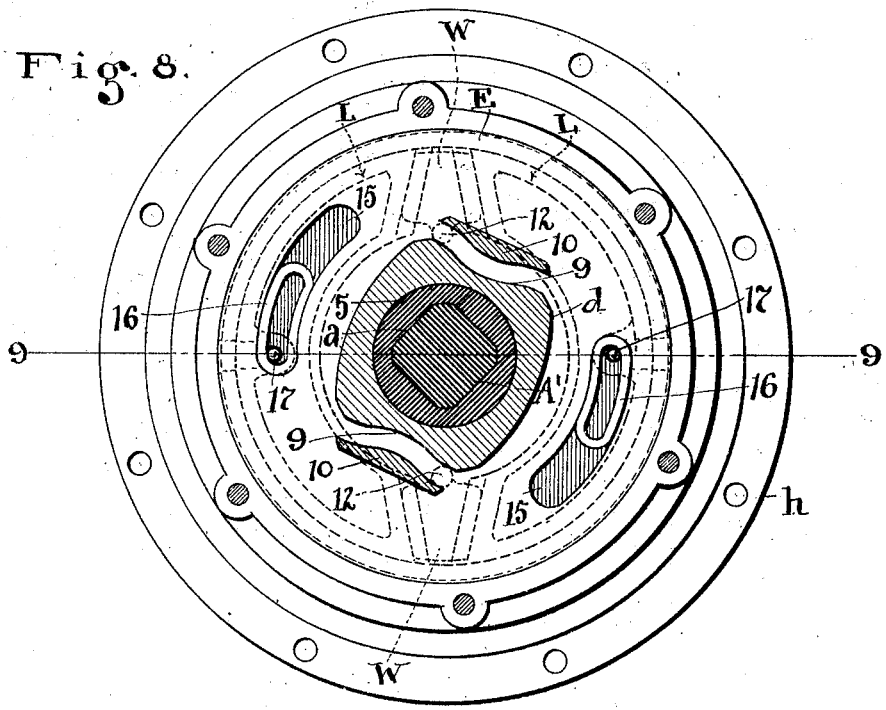
Figure 9:
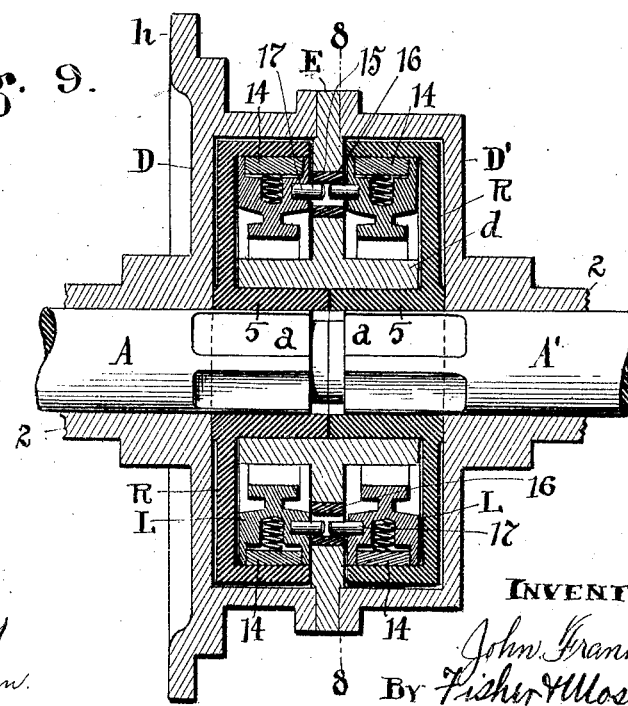

In the accompanying drawings, Figure 1 is a horizontal sectional view of the invention on the axis thereof. Fig. 2 is a detail of the division wall of the driving member having cam shaped hubs, and Fig. 3 is a side elevation of Fig. 2. Fig. 4 is a detail of the wedge which operates the friction segments and is enlarged as compared with Fig. 1. Fig. 5 is a vertical cross sectional elevation of the parts on line 5—5, Fig. 1. Fig. 6 is a peripheral face view of two friction segments and one of the wedges therein. Fig. 7 is a diagrammatic view showing the relation of the connecting link to the segments to hold one of them neutral while the other is in action. Fig 8 is a sectional elevation on line 8—8, Fig. 9, and Fig. 9 is a sectional elevation lengthwise on the axle on a line corresponding to 9—9, Fig. 8.

As above indicated, the mechanism herein is designed to serve both for driving a machine and for braking the same under certain conditions, and may drive or brake at the same time without interfering with its compensating operations, all as will appear in the detailed description thereof. Thus, the invention shown is comprised in a two-part or divided axle A and A', having the ends thereof opposite each other and practically abutting, a casing or shell C of a size and pattern to house all the operating parts and to inclose the same therein in dust proof condition, and annular bearings B confined within the extension $c$ of said casing and between the same and the bearing sleeves 2 of the drive member. The said driving member is formed in two equal parts D and D' constructed to provide two interior chambers which are separated by the division member or wall E, seen in different elevations in Figs. 2 and 3, and bolted together with said side parts D and D' so as to be rigid and operative therewith. Rings or bands 3 are fixed by screws about the ends of sleeves 2 and bear against the ends of bearings B, so that thereby the right working relation is maintained between the said parts. Furthermore the side or section D of the drive member has a bevel gear G secured to a flange $h$ thereon by screws $g$, and said gear is meshed by a pinion P on drive shaft S. The said shaft and pinion are supported in bearing 4 in housing C, and power to drive the axles is communicated through said pinion and gear through said drive member and the friction mechanism within the same. At this point it should be remembered that the two axles or axle sections or parts A and A' are independent of each other both as to rotation and as to the immediate mechanism engaging the same for driving though the drive member is common to both axles and hence both get their power through gear G on said drive member. But wall or division member E sub-divides housing D, D' at the middle and forms two separate working chambers therein in which the friction or clutch mechanism is contained. Said wall E also has the tubular cam hubs $d$ open from side to side at its center and adapted to receive the two hubs 5 of the two separate friction rims R which are rotatably locked upon the corresponding ends of axles A and A' by flat sides $a$ in this instance. This leaves the said friction rims R and the drive member D within which said rims are housed disconnected or free operatively, and if there were no interposed engaging means there would be no application of power to the axles. For the purposes of such engagement I employ two sets of friction segments L, one set of two segments within each friction rim R. Said segments have smooth outer engaging surfaces 8 adapted to frictionally engage on the inside of said rims and are constructed with inclined undercut or dove-tailed ends 7 so related as to provide engaging portions for the spreading wedges W, slidably mounted in and between said ends. Said wedges are provided with ribs 12 across their inner larger ends which ribs operatively engage at their extremities with flanges 10 on housing member E and bear continually on the cam surface 9 of the cams d. Preferably the said surfaces which are described as of cam pattern are shown as depressed between their ends, and the neutral or idle position of the wedges is at the middle of said surface, Fig. 5. This of course places the control of the said wedges primarily in the power driven or so-called driving member D, D', and the turning or rotating of said member in either direction will cause the said wedges to travel outward and frictionally lock the segments as they are designed to do, and the farther the said drive member is turned within its limits, the more positive is the engagement of said wedges and friction segments, the extreme limit of throw being shown in Fig. 8.

As a precaution to temporarily hold the segments L while the wedges W are getting into action I employ a spring pressed retarder 14, set into the engaging surfaces of said segments and which serve to detain or hold the segments against floating while otherwise free The shape of wedges or keys W is seen in Figs. 4 and 5, and Fig. 5 especially shows that said wedges have dovetailed or undercut sides adapted to work within the similarly fashioned channels transversely in the ends of segments L as above described, so as to afford positive mechanical control of the segments to disengage the same and not depend on springs or other means which are liable to get out of order. Finally, it will be noticed that division member E has two curved or segmental slots 15, and an oblong link 16 in each slot adapted to run lengthwise therein. Also that lateral pins or projections 17 in the sides of the segments extend into said links and slots and that said pins have limited play in said links, while the links themselves have the run of said slots 15. Thus I am enabled to give each set of segments a limited amount of independent play and at the same time control such play when it reaches a certain limit. For example, suppose that both axles are clutched for joint rotation by throwing the parts into position Fig. 8. The power is now on both wheels alike and the travel is in the direction of rotation. A turn of the vehicle in either direction will now cause a faster travel of one wheel and its shaft than the other wheel and shaft because of the larger radial travel required on one side or the other. Thus the inner or slower wheel remains in clutching action as in Fig. 8 and drives the machine, whereas the more rapid travel of the other wheel and its shaft causes a corresponding movement of its friction rim R and also the segments therein by reason of the frictional engagement between them through their retarding device 14 and whereby the cam flanges 10 withdraw the wedges W until the neutral or half way position is reached. This unlocks the segments L from friction rim R and permits the wheel controlled thereby to revolve faster than the drive wheel. But unless some suitable means were provided to check and hold the segments and their wedges when the neutral point is reached, the momentum and the friction retarders 14 would carry them beyond and cause interlocking of the parts again by reason of the wedges riding up on the opposite incline. In that event the wheel would no longer be free in running but would be dragging and the tire would be slipping and wearing. The means employed by me to prevent this from occurring and which serves to hold the friction drive parts for the faster wheel at a neutral point comprises the links 16 and pins 17. Thus, when one wheel drives and the other is running free, the link 16 is held by the driving members at one extreme end of slot 15 by its pins 17, thereby preventing any movement of the link in its slot 15. The pin 17 on the free or floating members however, is now positioned in the other end of the slot in the links and said segments are thereby positively held at neutral position. Thus, the driving members are utilized to check the free members in their independent rotation and prevent their wedges from riding up the reverse incline. In other words, when one wheel is driving and the other is speeding faster, the wedges of the faster wheel are positively held at the neutral position, say as seen in Fig. 5.

The clutches operate similarly in running the machine in either direction. It is also possible with my device to check the movement of the vehicle by retarding the applied power. This latter is commonly done by throttling the power more or less instead of applying the usual brakes to the wheels. Thus, in operation if the vehicle was being driven in a straight line, and the power was suddenly throttled, the wheels would for a moment travel faster than the power transmitting members, and both sets of wedges and friction members would immediately ride from the extreme high point of the cam to the neutral position and then up the opposite incline into wedging and locking relation again. This would brake or retard the vehicle in its running through both wheels, if running in a direct line, but if made to occur while on a curve only one of the wheels would be thrown into such braking action and the other would be free.

For convenience each part or section of the axle is referred to in the claims also as an axle.

In a double chain drive machine, wherein a countershaft is used, the compensating mechanism would be mounted on this shaft instead of the rear axle.

What I claim is:—

1. In vehicles, an axle in two parts, a compensating mechanism thereon comprising a power driven member mounted loosely over said axle about its meeting ends, and means to frictionally engage the parts of said axle with said power driven member comprising a separate friction rim for each axle part rigid therewith and frictional means within each rim adapted to lock said parts together.

2. In vehicles, a two-part axle having meeting ends, a compensating mechanism thereon about said meeting ends comprising a friction rim rigid with each and a drive member in which said rims are inclosed having a gear rigid therewith, and separate friction engaging means for each rim within said member, and cams adapted to cause engagement of said friction engaging means.

3. In vehicles, an axle in two parts arranged end to end, a friction rim rigidly fixed on each part, a drive member loosely mounted over both said rims and having a chamber for each, and friction mechanism in said chambers adapted to lock said rims and said drive member operatively together.

4. In vehicles, a sectional axle having meeting ends and compensating mechanism for both sections comprising a drive member loosely sleeved over both of said meeting ends and provided with a divided internal chamber, a friction rim mounted on each of said ends of the axle within said chamber, and means within said rims to make separate locking engagement thereof with said drive member.

5. In vehicles, an axle divided at its middle and separate friction rims rigidly fixed on the adjacent ends thereof, in combination with a single drive member for said rims having a dividing wall between said rims and a drive gear thereon, a part having a cam surface within said drive member and friction rims, and friction segments and wedges between said rims and cam surfaces adapted to act separately with both rims.

6. In vehicles, a compensating mechanism comprising a chambered drive member formed in two parts and having a gear fixed on one part and a division wall between said parts having a cam shaped hub on each side thereof, and friction mechanism housed in said drive member on each side of said division wall.

7. A vehicle axle in two parts end to end, a two-part drive member having a sleeve on each part engaged over a corresponding end of said shaft, and a division wall between the parts of said drive member having a cam hub on each side, in combination with a friction rim on each side of said wall having a hub locked on the corresponding axle part, and friction mechanism within each of said rims having operating engagement with the corresponding cam hub and rim.

8. A vehicle axle in two parts end to end, a compensating mechanism operatively connecting said parts and comprising a driving member having two inside chambers and a wall with lateral cam shaped hubs between said chambers, in combination with a friction rim fixed rigidly on each axle part in each of said chambers and friction mechanism between said rims and said cam shaped hubs consisting of friction segments and wedges between said segments.

9. A two-part vehicle axle and a two-part driving member sleeved thereon at the meeting ends thereof and a division wall centrally in said driving member having a cam shaped hub on each side, two friction rims within said driving member having each a hub within the corresponding hub of said division wall and locked on the corresponding part of said axle, and friction segments and locking wedges therefor within each of said friction rims.

10. In compensating mechanism for vehicle wheels, a chambered driving member having a division wall centrally and a cam hub on said wall in each chamber, said wall being provided with segmental slots oppositely as to its center, in combination with a friction rim in each of said chambers, friction segments within said rims having opposite projections entering said slots and sliding parts in said slots in which said opposite projections operatively engage.

11. A two-part vehicle axle and compensating mechanism adapted to operatively unite said axle parts comprising a chambered driving member with a central division wall having segmental slots communicating with both said chambers, in combination with friction mechanism in said chambers consisting of friction rims and segments and wedges to spread and lock said segments, the said segments having projections on their inner sides and links slidable in said slots operatively engaged by the said projections.

12. In compensating mechanism for vehicle wheels, a two part shaft and separate friction rim members fixed thereon, and friction devices therefor having a common drive member adapted to be interlocked therewith, and means intermediate of said friction devices adapted to positively withhold one neutral while the other is frictionally engaged with said drive member.

13. A compensating power transmitting device comprising a set of independently rotatable friction members and a common drive member therefor, and friction devices adapted to be thrown into action therewith by rotation of the parts in either direction from a neutral point, and means to positively limit the movements of said friction devices in respect to each other and thereby prevent clutching action of both at opposite extremes from their neutral position.

14. A compensating device for transmitting power comprising independent friction rims and radially operating friction devices therefor, and a power member adapted to throw said devices into and out of clutching positions for rotation of said parts in either direction, and means to withhold the respective friction devices from joint operation at all times except when the same speed of rotation in the same direction is common to all said parts.

15. A friction power transmitting device having rotating members adapted to apply power therethrough either singly or jointly for rotation in either direction, and positive determining means adapted to operate automatically to prevent joint rotation of said members at the same speed when change of conditions require different speeds.

16. A compensating mechanism for power driven vehicles comprising separate power applying members having frictional devices adapted to operate automatically, and positive self acting means to control the relations of said frictional devices by their respective movements one to the other.

17. In vehicles, a two-part shaft and compensating drive mechanism therefor comprising separate friction rims for said shaft parts, a power member and means to frictionally engage said member with either or both of said friction rims, and positive means to prevent reinterlocking of said parts with both rims during changes involving a reversal and release of one part.

18. In vehicles, a power shaft in two parts, a compensating mechanism thereon comprising a power driven member mounted loosely upon said shaft about its meeting ends, and means to frictionally engage the parts of said shaft with said power driven member comprising a separate friction rim for each shaft part rigid therewith and frictional means within each rim engaged with said power driven member adapted to lock said parts together upon rotation thereof in either direction from a neutral position, and connecting devices for the respective frictional means within each rim adapted to limit independent movement from and to neutral positions only.

19. In vehicles, a two-part axle having meeting ends, a compensating mechanism thereon about said meeting ends comprising a friction rim rigid with each and a drive member in which said rims are inclosed having a gear rigid therewith, and separate friction engaging means for each rim within said member, and cams adapted to cause engagement of said friction engaging means, and connecting means for said separate friction engaging means adapted to limit their movements in respect to each other for the purposes set forth.

20. In vehicles, an axle in two parts arranged end to end, a friction rim fixed on each part, a drive member loosely mounted over both said rims and having a chamber for each, and separate friction mechanism in said chambers adapted to lock said rims and said drive member operatively together and having a coupling connection between them to limit their movements in respect to each other and to said drive member.

21. In vehicles, a sectional axle having meeting ends and compensating mechanism for both sections comprising a drive member loosely sleeved over both said meeting ends and provided with a divided internal chamber, a friction rim fixed on each of said ends of the axle within said chamber, and means within each of said rims to make separate locking engagement thereof with said drive member, and said means having coupled engagement adapted to check the movement thereof in respect to each other for the purposes as described.

22. In vehicles, an axle divided at its middle and separate friction rims rigidly fixed on the adjacent ends thereof, in combination with a single drive member for said rims having a dividing wall between said rims and a drive gear thereon, a part having a cam surface within said drive member and friction rims, and friction segments and wedges between said rims and cam surfaces adapted to act separately with both rims, and means adapted to limit the movements of the respective friction segments on opposite sides of said dividing wall in respect to one another.

23. In vehicles, a compensating mechanism comprising a chambered drive member formed in two parts and having a gear fixed on one part and a division wall between said parts having a cam shaped hub on each side thereof, and friction mechanism housed in said drive member on each side of said division wall and respectively provided with different connections adapting limited movements thereof one to the other.

24. A vehicle axle in two parts end to end, a two-part drive member having a sleeve on each part engaged over a corresponding end of said shaft, and a division wall between the parts of said drive member having a cam hub on each side, in combination with a friction rim on each side of said wall having a hub locked on the corresponding axle part, and friction mechanism within each of said rims having operating engagement with the corresponding cam hub and rim, and operating engagement with each other to limit their movement in respect to each other.

25. A vehicle axle in two parts end to end, a compensating mechanism operatively connecting said parts and comprising a driving member having two inside chambers and a wall with lateral cam shaped hubs between said chambers, in combination with a friction rim fixed on each axle part in each of said chambers and friction mechanism between said rims and said cam shaped hubs consisting of friction segments and wedges between said segments, and check connections between the respective friction mechanism on opposite sides of said wall adapting them to play independently within predetermined limits.

26. A two-part vehicle axle and a two-part driving member sleeved thereon at the meeting ends thereof and a division wall centrally in said driving member having a cam shaped hub on each side, two friction rims within said driving member having each a hub within the corresponding hub of said division wall and locked on the corresponding part of said axle, and friction segments and locking wedges therefor within each of said friction rims and linked connections between the respective segments of the separate rims to limit and control their independent play within the rims.

In testimony whereof I sign this specification in the presence of two witnesses.

JOHN FRANK ROGERS.

Witnesses:
E. M. FISHER,
R. B. MOSER.